(12) United States Patent
Mues

(10) Patent No.: US 11,499,240 B2
(45) Date of Patent: Nov. 15, 2022

(54) REINFORCED SEPARATOR FOR ALKALINE HYDROLYSIS

(71) Applicant: AGFA-GEVAERT NV, Mortsel (BE)

(72) Inventor: Willem Mues, Mortsel (BE)

(73) Assignee: AGFA-GEVAERT NV, Mortsel (BE)

( * ) Notice: Subject to any disclaimer, the term of this patent is extended or adjusted under 35 U.S.C. 154(b) by 249 days.

(21) Appl. No.: 16/628,695

(22) PCT Filed: Jul. 9, 2018

(86) PCT No.: PCT/EP2018/068515
§ 371 (c)(1),
(2) Date: Jan. 6, 2020

(87) PCT Pub. No.: WO2019/011844
PCT Pub. Date: Jan. 17, 2019

(65) Prior Publication Data
US 2020/0181785 A1    Jun. 11, 2020

(30) Foreign Application Priority Data

Jul. 10, 2017 (EP) ..................... 17180418

(51) Int. Cl.
*C25B 13/02* (2006.01)
*C25B 13/08* (2006.01)
(Continued)

(52) U.S. Cl.
CPC .......... *C25B 13/02* (2013.01); *B01D 67/0009* (2013.01); *B01D 69/10* (2013.01);
(Continued)

(58) Field of Classification Search
CPC ...... B01D 67/0009; B01D 69/10; C25B 1/04; C25B 9/73; C25B 13/02; C25B 13/08
See application file for complete search history.

(56) References Cited

U.S. PATENT DOCUMENTS

| | | | |
|---|---|---|---|
| 2002/0117439 A1* | 8/2002 | Paul | B01D 67/0011 |
| | | | 210/493.4 |
| 2013/0334123 A1 | 12/2013 | Romdhane et al. | |
| 2018/0171494 A1 | 6/2018 | Ito et al. | |

FOREIGN PATENT DOCUMENTS

| | | |
|---|---|---|
| EP | 0 232 923 A1 | 8/1987 |
| JP | 2011-524606 A | 9/2011 |

(Continued)

OTHER PUBLICATIONS

Korean Intellectual Property Office, Notice of Non-Final Rejection in Korean Patent Application No. 10-2020-7000654, 10 pp. (dated Jun. 7, 2021).

(Continued)

*Primary Examiner* — James C Goloboy
(74) *Attorney, Agent, or Firm* — Leydig, Voit & Mayer, Ltd.

(57) ABSTRACT

A reinforced separator for alkaline hydrolysis includes a porous support, a first porous polymer layer contiguous with one side of the support and a second porous polymer layer contiguous with the other side of the support, characterized in that the maximum pore diameter at the outer surface of the first porous polymer layer $PD_{max}(1)$ and of the second porous polymer layer $PD_{max}(2)$ are different from each other and wherein a ratio between $PD_{max}(2)$ and $PD_{max}(1)$ is between 1.25 and 10.

14 Claims, 2 Drawing Sheets

(51) Int. Cl.
*C25B 1/04* (2021.01)
*C25B 9/73* (2021.01)
*B01D 67/00* (2006.01)
*B01D 69/10* (2006.01)

(52) U.S. Cl.
CPC .................. *C25B 1/04* (2013.01); *C25B 9/73* (2021.01); *C25B 13/08* (2013.01)

(56) References Cited

FOREIGN PATENT DOCUMENTS

| | | | |
|---|---|---|---|
| JP | 2014-129563 A | | 7/2014 |
| JP | 2014129563 A | * | 7/2014 |
| JP | 2015-117417 A | | 6/2015 |
| WO | 2006/015462 A2 | | 2/2006 |
| WO | 2009/147084 A1 | | 12/2009 |

OTHER PUBLICATIONS

Official Communication issued in International Patent Application No. PCT/EP2018/068515, dated Oct. 19, 2018.
Office Action relating to Japanese Patent Application No. 2020-501271 dated Jan. 20, 2021, 4 pages.

* cited by examiner

REINFORCED SEPARATOR FOR ALKALINE HYDROLYSIS

CROSS REFERENCE TO RELATED APPLICATIONS

This application is a 371 National Stage Application of PCT/EP2018/068515, filed Jul. 9, 2018. This application claims the benefit of European Application No. 17180418.0, filed Jul. 10, 2017, which is incorporated by reference herein in its entirety.

BACKGROUND OF THE INVENTION

1. Field of the Invention

The present invention relates to a reinforced separator for alkaline hydrolysis and to a method to produce such separators.

2. Description of the Related Art

Hydrogen is being considered an important future energy carrier, which means it can store and deliver energy in a usable form. Energy is released by an exothermic combustion reaction with oxygen thereby forming water. During such combustion reaction, no greenhouse gases containing carbon are emitted.

As an energy carrier, hydrogen is not an energy source itself; it can only be produced from other sources of energy, such as fossil fuels, renewable sources or nuclear power by different energy conversion processes.

Alkaline water electrolysis is an important manufacturing process of hydrogen.

In an alkaline water electrolysis cell, a so-called separator or diaphragm is used to separate the electrodes of different polarity to prevent a short circuit between these electronic conducting parts (electrodes) and to prevent the recombination of $H_2$ (formed at the cathode) and $O_2$ (formed at the anode) by avoiding gas crossover. While serving in all these functions, the separator should also be a highly ionic conductor for transportation of $OH^-$ ions from the cathode to the anode.

EP232923 discloses an ion-permeable diaphragm prepared by immersing an organic fabric in a dope solution, which is applied on a glass sheet. After phase inversion, the diaphragm is then removed from the glass sheet. There is however a large difference between the maximum pore diameters of both sides of a separator prepared according to the method disclosed in EP-A 232923.

EP-A 1776490 (VITO) discloses a process of preparing an ion-permeable web-reinforced separator membrane. The process leads to a membrane with symmetrical characteristics. The process includes the steps of providing a web and a suitable paste, guiding the web in a vertical position, equally coating both sides of the web with the paste to produce a paste coated web, and applying a symmetrical surface pore formation step and a symmetrical coagulation step to the paste coated web to produce a web-reinforced membrane.

WO2009/147084 (Agfa Gevaert) discloses manufacturing technology to produce a membrane with symmetrical characteristics as described in EP-A 1776490.

The separator disclosed in the above mentioned patent applications has identical pore sizes on both sides of the separator, herein referred to as a symmetric separator.

To prevent recombination of $H_2$ and $O_2$ by avoiding gas crossover, the separator preferably has "small" pore sizes. A disadvantage of a symmetric separator having such "small" pore sizes is the occurrence of the so-called "bubble trap". Gas solubilized in the electrolyte may separate from the electrolyte due to a higher temperature inside the separator. Such gas cannot leave the separator due to the small pores on each side of the separator, resulting in a loss of efficiency.

On the other hand, to ensure efficient transportation of $OH^-$ ions from the cathode to the anode, "larger" pore sizes are preferred. An efficient transportation of the $OH^-$ ions requires an efficient penetration of electrolyte into the separator.

With symmetric separators it is difficult to achieve all requirement of an efficient separator mentioned above, i.e. avoiding the "bubble trap", avoiding gas crossover and ensuring efficient transport of the $OH^-$ ions.

SUMMARY OF THE INVENTION

It is an object of the invention to provide a reinforced separator, which combines sufficient gas barrier properties without the occurrence of a bubble trap and sufficient penetration of electrolyte into the separator to ensure ionic conductivity.

This object is realized with the separator as defined below.

Another object of the invention is to provide a manufacturing method to produce such a separator.

This object is realized with the manufacturing method as defined below.

Further objects of the invention will become apparent from the description hereinafter.

DETAILED DESCRIPTION OF THE PREFERRED EMBODIMENTS

Reinforced Separator for Alkaline Hydrolysis

Figure 1:
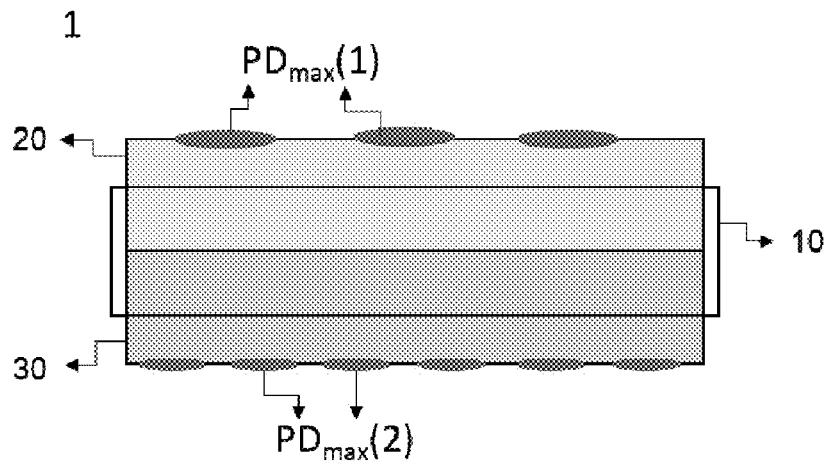
FIG. 1 shows schematically an embodiment of a reinforced separator according to the present invention.

The reinforced separator for alkaline hydrolysis (1) according to the present invention comprises a porous support (10), a first porous polymer layer (20) contiguous with one side of the support and a second porous polymer layer (30) contiguous with the other side of the support, characterized in that the maximum pore diameter at the outer surface of the first porous polymer layer ($PD_{max}(1)$) and of the second porous polymer layer ($PD_{max}(2)$) are different from each other and wherein a ratio $PD_{max}(2)/PD_{max}(1)$ is between 1.25 and 10.

The ratio $PD_{max}(2)/PD_{max}(1)$ is preferably between 2 and 7.5, more preferably between 2.5 and 5.

$PD_{max}(1)$ is preferably between 0.05 µm and 0.3 µm, more preferably between 0.08 µm and 0.25 µm, most preferably between 0.1 µm and 0.2 µm.

$PD_{max}(2)$ is preferably between 0.2 µm and 6.5 µm, more preferably between 0.2 µm and 1.50 µm, most preferably between 0.2 µm and 0.5 µm.

The smaller $PD_{max}(1)$ ensure an efficient separation of $H_2$ and $O_2$ while $PD_{max}(2)$ ensures a good penetration of the electrolyte in the separator resulting in a sufficient ionic conductivity.

The porosity of the separator is preferably between 30 and 70%, more preferably between 40 and 60%.

The thickness of the separator is preferably between 100 and 1000 µm, more preferably between 250 and 750 µm. If the thickness of the separator is less than 100 µm, its physical strength maybe insufficient, when the thickness is above 1000 µm, the electrolysis efficiency may decrease.

The maximum pore diameter referred to is preferably measured using the Bubble Point Test method as below. That method is described in American Society for Testing and Materials Standard (ASMT) Method F316.

Porous Support

The porous support is used to reinforce the separator to ensure its mechanical strength.

The porous support includes a porous fabric, porous metal plates or porous ceramic plates.

The porous support is preferably a porous fabric, more preferably a porous polymer fabric.

Suitable porous polymer fabrics are prepared from polypropylene (PP), polyethylene (PE), polysulfone (PS), polyphenylene sulfide (PPS), polyamide/nylon (PA), polyethersulfone (PES), polyphenyl sulfone, polyethylene terephthalate (PET), polyether-ether ketone (PEEK), sulfonated polyether-ether keton (s-PEEK), monochlorotrifluoroethylene (CTFE), copolymers of ethylene with tetrafluorethylene (TFE) or chlorotrifluorethylene (CTFE), polyimide, polyether imide and m-aramide.

The temperature limit of the separator (for long-term stability in strong alkaline conditions) may depend on the porous support used.

For example, a preferred porous support for low temperature applications (≤80° C.) is made of polypropylene, while a preferred porous support for high temperature applications (≤120° C.) is prepared from an ethylene-tetrafluoro-ethylene copolymer or from polyether-ether ketone.

The porous polymer fabric may be woven or non-woven.

The open area of the porous support is preferably between 20 and 80%, more preferably between 40 and 70%, to ensure good penetration of the electrolyte into the support.

The porous support has pores or mesh openings preferably having an average diameter between 100 and 1000 µm, more preferably between 300 and 700 µm.

The support preferably has a thickness between 100 and 750 µm, more preferably between 125 and 300 µm.

The porous support is preferably a continuous web to enable a manufacturing process as disclosed in EP-A 1776490 and WO2009/147084 and disclosed below.

Porous Polymer Layer

The first and the second porous polymer layer comprises a polymer, also referred to as membrane polymer. The polymer forms a three dimensional porous network, the result of a phase inversion step in the preparation of the separator, as described below.

The membrane polymer is preferably selected from the group consisting of polysulfone (PSU), polyether sulfone (PES), polyvinylidene fluoride (PVDF), polyacrylonitrile (PAN), polyethyleneoxide (PEO), polymethylmethacrylate (PMMA) and copolymers thereof.

PVDF and vinylidenefluoride (VDF)-copolymers are preferred for their oxidation/reduction resistance and film-forming properties. Among these, terpolymers of VDF, hexanefluoropropylene (HFP) and chlorotrifluoroethylene (CTFE) are preferred for their excellent swelling properties, heat resistance and adhesion to electrodes.

A particularly preferred membrane polymer is polysulfone, as disclosed in for example EP-A 3085815, paragraph [0027] to [0032].

Another preferred membrane polymer is a polyether sulfone (PES), disclosed in EP-A 3085815, paragraphs [0021] to [0026]. The polyether sulfone may be mixed with polysulfone as also disclosed in EP-A 3085815.

The porous polymer layer preferably also comprises a hydrophilic inorganic material.

The hydrophilic inorganic material may further improve the ionic conductivity trough the separator.

The hydrophilic inorganic material is preferably selected from the group consisting of $TiO_2$, $HfO_2$, $Al_2O_3$, $ZrO_2$, $Zr_3(PO_4)_4$, $Y_2O_3$, $SiO_2$, perovskite oxide materials, SiC, $BaSO_4$, and C(Pt/Rh/Ru).

More preferred hydrophilic inorganic materials are metal oxides and hydroxides.

Highly preferred hydrophilic inorganic materials are $TiO_2$, $BaSO_4$ and $ZrO_2$.

Manufacturing of the Reinforced Separator for Alkaline Hydrolysis

The reinforced separator for alkaline hydrolysis as described above is preferably prepared by a manufacturing method comprising the steps of:
  applying a dope solution, as described below, on either surface of a support,
  performing phase inversion on the applied dope solutions, thereby obtaining a first porous polymer layer on one side of the support and a second porous polymer layer on the other side of the support,
wherein the maximum pore diameter at the outer surface of the first porous polymer layer ($PD_{max}(1)$) and of the second porous polymer layer ($PD_{max}(2)$) are different from each other.

A preferred method of manufacturing the reinforced separator is disclosed in EP-A 1776490 (VITO) and WO2009/147084 (Agfa Gevaert). These methods result in web-reinforced separators wherein the web, i.e. the porous support, is nicely embedded in the separator, without appearance of the web at a surface of the separator.

However, in both applications, the manufacturing method results in symmetric separators.

In the present invention, the same manufacturing method is preferably used, however using different dope solution for each side of the separator and/or using different phase separation steps, in particular different VIPS steps, for each side of the separator. With such a method, an asymmetric separator as described above may be obtained.

Dope Solution

The dope solution preferably comprises a membrane polymer as described above, a hydrophilic inorganic material as described above and a solvent.

The solvent of the dope solution is preferably an organic solvent wherein the membrane polymer can be dissolved. Moreover, the organic solvent is preferably miscible in water.

The solvent is preferably selected from N-methyl-2-pyrrolidone (NMP), N-ethyl-pyrrolidone (NEP), N,N-dimethylformamide (DMF), formamide, dimethylsulfoxide (DMSO), N,N-dimethylacetamide (DMAC), acetonitrile, and mixtures thereof.

The dope solution may further comprise other ingredients to optimize the properties of the obtained polymer layers, for example their porosity and the maximum pore diameter at their outer surface.

The dope solution preferably comprises a pore forming promoting agent such as polyvinylpyrrolidone (PVP), polyvinylalcohol (PVA), polyvinylacetate (PVAc), methylcellulose and polyethylene oxide. These compounds may have an influence on the maximum pore diameter and/or the porosity of the porous polymer layers.

The concentration of these pore forming promoting agents in the dope solution is preferably between 0.1 and 15 wt %, more preferably between 0.5 and 10 wt %.

In a particular preferred embodiment, the dope solution comprises glycerol. Glycerol also has an influence on the pore formation in the porous polymer layer.

The concentration of glycerol is preferably between 0.1 and 15 wt %, more preferably between 0.5 and 5 wt %.

The dope solution used to prepare the first porous polymeric layer may be identical to the dope solution used to prepare the second porous polymeric layer, or the dope solution used for both polymeric layers may be different from each other.

The dope solution used to prepare the first porous polymeric layer may be optimized to obtain small maximum pore diameters ($PD_{max}(1)$), while the dope solution to prepare the second porous polymeric layer may be optimized to obtain larger maximum pore diameters ($PD_{max}(2)$), for example by optimizing the concentration of glycerol and/or PVP in de dope solutions.

Applying the Dope Solution

The dope solution may be applied to the surface of the support by any coating or casting technique.

A preferred coating technique is for example extrusion coating.

In a highly preferred embodiment, the dope solutions are applied by a slot die coating technique wherein two slot coating dies (FIGS. 2 and 3, 200 and 300) are located on either side of the porous support.

The slot coating dies are capable of holding the dope solution at a predetermined temperature, distributing the dope solutions uniformly over the support, and adjusting the coating thickness of the applied dope solutions.

The viscosity of the dope solutions, when used in a slot die coating technique, is preferably between 1 and 500 Pa·s, more preferably between 10 and 100 Pa·s, at coating temperature and at a shear rate of $1\ s^{-1}$.

The dope solutions are preferably shear-thinning. The ratio of the viscosity at a shear rate of $1\ s^{-1}$ to the viscosity at a shear rate of $100\ s^{-1}$ is preferably at least 2, more preferably at least 2.5, most preferably at least 5.

Figure 2:
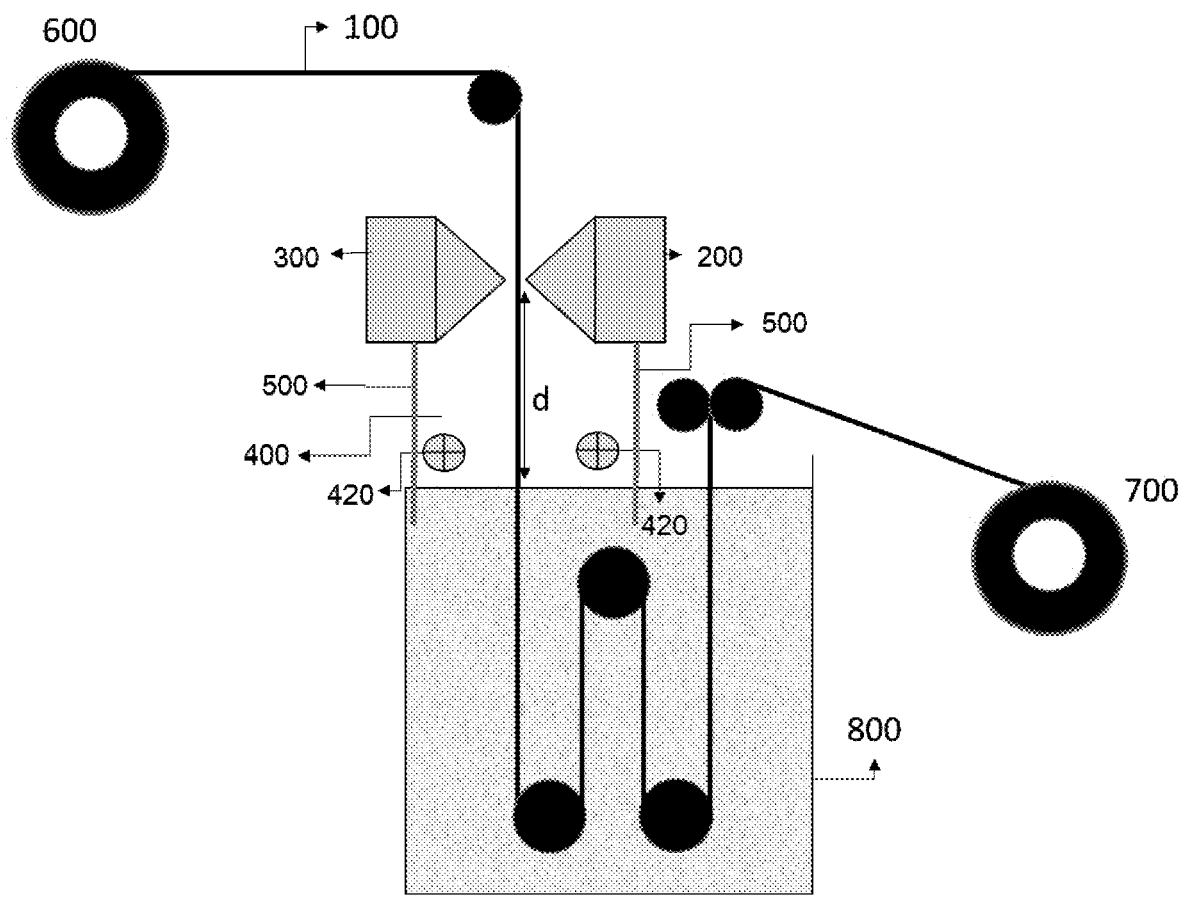
FIG. 2 shows schematically an embodiment of a manufacturing method of a reinforced separator according to the present invention.
Figure 3:
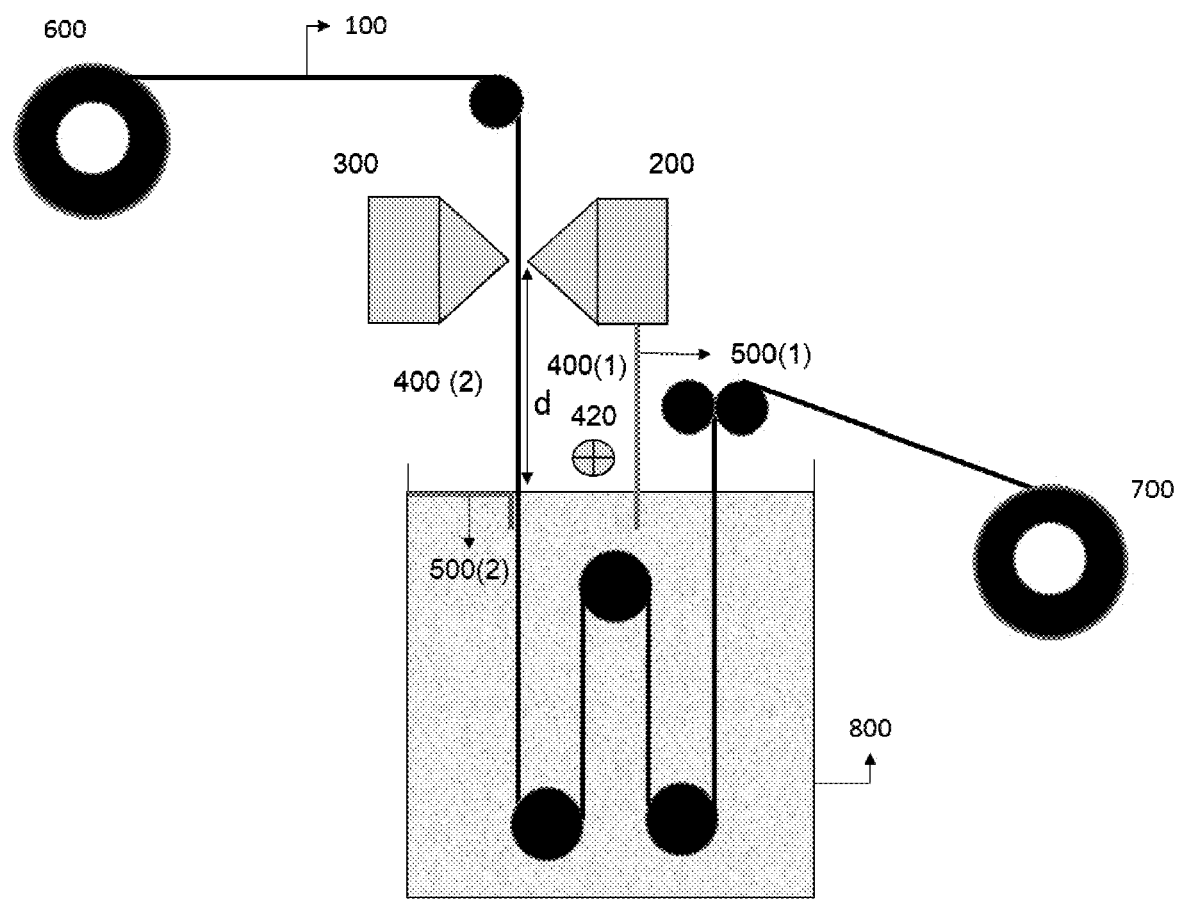
FIG. 3 shows schematically another embodiment of a manufacturing method of a reinforced separator according to the present invention.

The porous support is preferably a continuous web, which is transported downwards between the slot coating dies (200, 300) as shown in FIGS. 2 and 3.

The coating thickness is adjusted to obtain a first and a second polymer layer having a desired thickness.

Immediately after the application, the porous support becomes impregnated with the dope solutions.

Phase Inversion Step

The phase inversion step comprises a so-called Liquid Induced Phase Separation (LIPS) step and preferably a combination a Vapour Induced Phase Separation (VIPS) step and a LIPS step.

Both LIPS and VIPS are non-solvent induced phase-inversion processes.

In a LIPS step the porous support coated on both sides with the dope solution is contacted with a non-solvent that is miscible with the solvent of the dope solution.

Typically, this is carried out by immersing the porous support coated on both sides with the dope solutions into a non-solvent bath, also referred to as coagulation bath.

The non-solvent is preferably water, mixtures of water and an aprotic solvent selected from the group consisting of N-methylpyrrolidone (NMP), dimethylformamide (DMF), dimethylsulfoxide (DMSO) and dimethylacetamide (DMAC), water solutions of water-soluble polymers such as PVP or PVA, or mixtures of water and alcohols, such as ethanol, propanol or isopropanol.

The non-solvent is most preferably water.

The temperature of the water bath is preferably between 20 and 90° C., more preferably between 40 and 70° C.

The transfer of solvent from the coated polymer layer towards the non-solvent bath and of non-solvent into the polymer layer leads to phase inversion and the formation of a three-dimensional porous polymer network.

In a preferred embodiment, the continuous web (100) coated on either side with a dope solution is transported downwards, in a vertical position, towards the coagulation bath (800) as shown in FIGS. 2 and 3.

In a VIPS step, the porous support coated with the dope solutions is first exposed to humid air prior to immersion in the coagulation bath.

Typically for these systems, water is a non-solvent such that the water transfer associated with the humid air exposure step leads to phase separation.

In the manufacturing method shown in FIG. 2, VIPS is carried out in the area 400, between the slot coating dies (200, 300) and the surface of the non-solvent in the coagulation bath (800), which is shielded from the environment with for example thermal isolated metal plates (500).

The extent and rate of water transfer in the VIPS step can be controlled by adjusting the velocity of the air, the relative humidity and temperature of the air, as well as the exposure time.

The exposure time may be adjusted by changing the distance d between the slot coating dies (200, 300) and the surface of the non-solvent in the coagulation bath (800) and/or the speed with which the elongated web 100 is transported from the slot coating dies towards the coagulation bath.

The relative humidity in the VIPS area (400) may be adjusted by the temperature of the coagulation bath and the shielding of the VIPS area (400) from the environment and from the coagulation bath.

The speed of the air may be adjusted by the rotating speed of the ventilators (420) in the VIPS area (400).

The VIPS step carried out on one side of the separator, resulting in the first porous polymer layer, and on the other side of the separator, resulting in the second porous polymer layer, may be identical or different from each other.

By optimization of the parameters described above for the VIPS steps carried out on each side of the separator (FIGS. 3, 400(1) and (2)), the maximum pore diameter at the outer surface of the first porous polymer layer ($PD_{max}(1)$) and of the second porous polymer layer ($PD_{max}(2)$) may be adjusted to become different from each other and have the values as described above.

After the phase inversion step, preferably the LIPS step in the coagulation bath, a washing step may be carried out.

After the phase inversion step, or the optional washing step, a drying step is preferably carried out.

FIGS. 2 and 3 schematically illustrates a preferred embodiment to manufacture a separator according to the present invention.

The porous support is preferably a continuous web (100).

The web is unwinded from a feed roller (600) and guided downwards in a vertical position between two coating units (200) and (300).

With these coating units, a dope solution is coated on either side of the web. The coating thickness on either side of the web may be adjusted by optimizing the viscosity of the dope solutions and the distance between the coating units and the surface of the web. Preferred coating units are described in EP-B 2296825, paragraphs [0043], [0047], [0048], [0060], [0063], and FIG. 1.

The web coated on both sides with a dope solution is then transported over a distance d downwards towards a coagulation bath (800).

In the coagulation bath, the LIPS step is carried out.

The VIPS step is carried out before entering the coagulation bath in the VIPS areas. In FIG. 2, the VIPS area (400) is identical on both sides of the coated web, while in FIG. 3, the VIPS areas (400(1)) and (400(2)) on either side of the coated web are different.

The relative humidity (RH) and the air temperature in de VIPS area may be optimized using thermally isolated metal plates. In FIG. 2, the VIPS area (400) is completely shielded from the environment with such metal plates (500). The RH and temperature of the air is then mainly determined by the temperature of the coagulation bath. The air speed in the VIPS area may be adjusted by a ventilator (420).

In FIG. 3 the VIPS areas (400(1)) and (400(2)) are different from each other. The VIPS area (400(1)) on one side of the coated web is identical to the VIPS area (400) in FIG. 2. The VIPS area (400(2)) on the other side of the coated web is different from the area (400(1)). There is no metal plate shielding the VIPS area (400(2)) from the environment. However, the VIPS area (400(2)) is now shielded from the coagulation bath by a thermally isolated metal plate (500(2)). In addition, there is no ventilator present in the VIPS area 400(2). This results in a VIPS area (400(1)) having a higher RH and air temperature compared to the RH and air temperature of the other VIPS area (400(2)).

A high RH and/or a high air speed in a VIPS area typically result in a larger maximum pore diameter.

The RH in one VIPS area is preferably above 85%, more preferably above 90%, most preferably above 95% while the RH in another VIPS area is preferably below 80%, more preferably below 75%, most preferably below 70%.

After the phase separation step, the dried reinforced separator is then transported to a rolled up system (700).

A liner may be provided on one side of the separator before rolling up the separator and the applied liner.

EXAMPLES

Materials

All materials used in the following examples were readily available from standard sources such as ALDRICH CHEMICAL Co. (Belgium) and ACROS (Belgium) unless otherwise specified. The water used was deionized water.

PPS-fabric, a polyphenylenesulfide porous support (woven, thickness=350 μm, open area=60%), commercially available from NBC Inc.

$ZrO_2$, type E101 (a zirconium dioxide with an average particle size of 0.658 μm, a specific surface area of 22.26 $m^2/g$, and a pore volume of 0.140 ml/g), commercially available from MEL-Chemicals.

Udel P1700 NT LCD, a polysulfone membrane polymer commercially available from SOLVAY.

Glycerol, a pore widening agent, commercially available from MOSSELMAN.

NEP, N-ethyl-pyrrolidone, commercially available from BASF.

Measurements

The pore diameters of the separators were measured using the so-called Bubble Point Test method.

The bubble point test method is the most widely used for pore size determination. It is based on the fact that, for a given fluid and pore size with a constant wetting, the pressure required to force an air bubble through the pore is inverse proportion to the size of the hole.

The theory of capillarity states that the height of a water column in a capillary is indirectly proportional to the capillary diameter.

Surface tension forces held up the water in the capillary and as its diameter gets smaller, the weight in the water column get higher. Water can be pushed back down in a pressure which has the same equivalent height as that of the water column. Thus by determining pressure necessary to force water out of the capillary, the diameter of the capillar can be calculated.

In practice, the pore size of the filter element (separator) can be established by wetting the element with the fluid and measuring the pressure at which the first stream of bubbles is emitted from the upper surface of the element.

The procedure for the bubble point test method is described in American Society for Testing and Materials Standard (ASMT) Method F316.

The top of the filter is placed in contact with the liquid, the bottom with air, the filter holder is connected to a source of a regulated pressure. The air pressure is gradually increased and the formation of bubbles on the liquid side is noted. At pressures below the bubble point, gas passes across the filter only by diffusion, but when the pressure is high enough to dislodge liquid from the pores, bulk flow begins and bubbles will be seen.

The initial bubble test pressure determines the size (and location) of the largest hole, the open bubble point pressure determines the mean pore size of the element.

The Bubble point, the average pore diameter, the maximum pore diameter and the gas permeability of the separators were measured using a POROLUX 1000, commercially available from POROTEC.

Example 1

Preparation of the Symmetric Separator S-SEP

A dope solution was prepared by mixing the ingredients of Table 1.

TABLE 1

| Ingredients | wt % |
| --- | --- |
| $ZrO_2$ | 40.65 |
| Udel P1700 NT LCD | 12.835 |
| Glycerol | 1 |
| NEP | 45.515 |

The separator was prepared as disclosed in WO2009/147084, examples 2 to 5 and FIG. 2 of the present application.

The dope solution was coated on both sides of a 1.7 m wide PPS-fabric using slot die coating technology at a speed of 1 m/min.

The coated support was then transported towards a water bath (coagulation bath, 800) kept at 65° C.

A VIPS step was carried out before entering the water bath in an enclosed area (400, d=7 cm, RH=98%, no ventilation).

The coated support then entered the water bath for 5 minutes during which a liquid induced phase separation (HIPS) occurred.

After an in-line washing step at 70° C. during 15 minutes in water, the obtained separator was rolled up without drying, and afterwards cut in the desired format.

The obtained symmetric separator S-SEP had a total thickness of 500 µm.

Preparation of the Asymmetric Separator As-SEP

The asymmetric separator As-SEP was prepared as described above, however using a different VIPS step, as shown in FIG. 3 of the present application.

A different VIPS step was performed on each side of the porous support coated with the dope solution (FIGS. 3, 400(1) and 400(2) wherein d=7 cm).

The VIPS area 400(2) was open to the environment and the surface of the water bath was covered with a thermal isolating metal plate (500(2)). This resulted in VIPS area 400(2) having a RH of 70% and an air temperature of 25° C.

The VIPS area 400(1) was enclosed from the environment with a shielding plate 500(1) and the surface of the water batch was not covered. The ventilation (420) in the area was 1 m/s resulting in a RH of 98% and an air temperature of 65° C.

Evaluation of S-SEP and As-SEP

The Bubble point, the average Pore Diameter ($PD_{av}$), the maximum Pore Diameter ($PD_{max}$), and the gas permeability (measured at 5 bar) of both sides of the separators S-SEP and As-SEP were measured as described above. The results are given in Table 2.

TABLE 2

|  |  | Bubble point (bar) | $PD_{av}$ (µm) | $PD_{max}$ (µm) | Gas permeability (l/min · cm³) |
|---|---|---|---|---|---|
| S-SEP | Surface 1 | 2.2 | 0.15 | 0.39 | 4.1 |
|  | Surface 2 | 2.2 | 0.15 | 0.39 | 4.1 |
| As-SEP | Surface 1 | 1.4 | 0.12 | 0.45 | 4.5 |
|  | Surface 2 | 3.4 | 0.12 | 0.19 | 4.5 |

From the results in Table 2 it is clear that for the asymmetric separator As-SEP both surfaces have a different maximum pore diameter and bubble point.

When such an asymmetric separator (As-SEP) is used instead of a symmetric separator (S-SEP) in an alkaline electrolysis cell to produce hydrogen then the following was observed:
- a higher purity of the hydrogen and oxygen produced;
- less time necessary to reach a steady state;
- a lower water dissociation voltage, indicating a more efficient process.

The invention claimed is:

1. A method of preparing a reinforced separator for alkaline hydrolysis comprising:
   a porous support;
   a first porous polymer layer contiguous with a first side of the porous support; and
   a second porous polymer layer contiguous with a second side of the porous support; wherein
   a maximum pore diameter $PD_{max}(1)$ at an outer surface of the first porous polymer layer and a maximum pore diameter $PD_{max}(2)$ at an outer surface of the second porous polymer layer are different from each other; and
   a ratio $PD_{max}(2)/PD_{max}(1)$ is between 1.25 and 10, the method comprising:
   applying a dope solution including a membrane polymer, a hydrophilic inorganic material, and a solvent on the first side and on the second side of a porous support; and
   performing phase inversion on the dope solution applied to the first side of the porous support and the dope solution applied to the second side of the porous support to obtain a first porous polymer layer on the first side of the porous support and a second porous polymer layer on the second side of the porous support,
   wherein the step of performing phase inversion on the dope solution applied to the first side of the porous support is different from the step of performing phase inversion on the dope solution applied to the second side of the porous support.

2. The method according to claim 1, wherein the solvent in the dope solution is selected from the group consisting of N-methyl-2-pyrrolidone, N-ethyl-pyrrolidone, N,N-dimethyl-formamide, formamide, dimethylsulfoxide, N,N-dimethylacetamide, acetonitrile, and mixtures thereof.

3. The method according to claim 1, wherein the dope solution further includes polyvinylpyrrolidone or glycerol.

4. The method according to claim 1, wherein the dope solution applied to the first side of the porous support is different form the dope solution applied to the second side of the porous support.

5. The method according to claim 1, wherein the step of performing phase inversion includes performing Vapour Induced Phase Separation and Liquid Induced Phase Inversion.

6. The method according to claim 5, wherein the step of performing Vapour Induced Phase Separation on the dope solution applied to the first side of the porous support is different from the step of performing Vapour Induced Phase Separation on the dope solution applied to the second side of the porous support.

7. The method according to claim 5, wherein the step of performing Liquid Induced Phase Inversion is performed in a coagulation bath including water.

8. The method according to claim 1, further comprising:
   transporting the porous support in a vertical position during the step of applying the dope solution and the step of performing phase inversion.

9. The method according to claim 1, wherein $PD_{max}(1)$ is between 0.05 µm and 0.3 µm, and $PD_{max}(2)$ is between 0.2 µm and 6.5 µm.

10. The method according to claim 1, wherein the ratio $PD_{max}(2)/PD_{max}(1)$ is between 2 and 7.5.

11. The method according to claim 1, wherein each of the first porous polymer layer and the second porous polymer layer includes a membrane polymer and a hydrophilic inorganic material.

12. The method according to claim 11, wherein the membrane polymer includes polysulfone or polyethersulfone.

13. The method according to claim 11, wherein the hydrophilic inorganic material is selected from the group consisting of $TiO_2$, $BaSO_4$, and $ZrO_2$.

14. The method according to claim 12, wherein the hydrophilic inorganic material is selected from the group consisting of $TiO_2$, $BaSO_4$, and $ZrO_2$.

* * * * *